United States Patent [19]

Dupuy

[11] Patent Number: 5,483,537
[45] Date of Patent: Jan. 9, 1996

[54] METHOD FOR ALLOCATING A TIMESLOT WITHIN A FRAME TO A MOBILE ENTERING A COMMUNICATIONS CELL AND BASE TRANSCEIVER STATION IMPLEMENTING THIS METHOD

[75] Inventor: Pierre Dupuy, Paris, France

[73] Assignee: Alcatel Radiotelephone, Paris, France

[21] Appl. No.: 204,440

[22] Filed: Mar. 2, 1994

[30] Foreign Application Priority Data

Mar. 3, 1993 [FR] France ................................. 93 02472

[51] Int. Cl.⁶ ................................................. H04B 7/212
[52] U.S. Cl. ................................. 370/95.3; 370/100.1
[58] Field of Search ............................... 370/95.1, 95.3, 370/100.1, 108; 455/33.1, 33.4

[56] References Cited

U.S. PATENT DOCUMENTS 4,689,787  8/1987  Hotta ..................................... 370/104.1
5,363,373  11/1994  Nakahara et al. ..................... 370/95.1

FOREIGN PATENT DOCUMENTS

0295227A1  12/1988  European Pat. Off. ..
WO9113502  9/1991  WIPO .

*Primary Examiner*—Douglas W. Olms
*Assistant Examiner*—Min Jung
*Attorney, Agent, or Firm*—Sughrue, Mion, Zinn, Macpeak & Seas

[57] ABSTRACT

In a method for allocating a timeslot within a frame to a communication mobile entering a mobile radio system cell from a set of concentric cells around a basic cell managed by a base transceiver station the uplink temporal structure is offset relative to the downlink temporal structure by a time-delay equal to the sum of a basic offset between the basic downlink temporal structure and the basic uplink temporal structure of the basic cell and an offset time dependent on the rank of the cell within said set of cells.

32 Claims, 5 Drawing Sheets

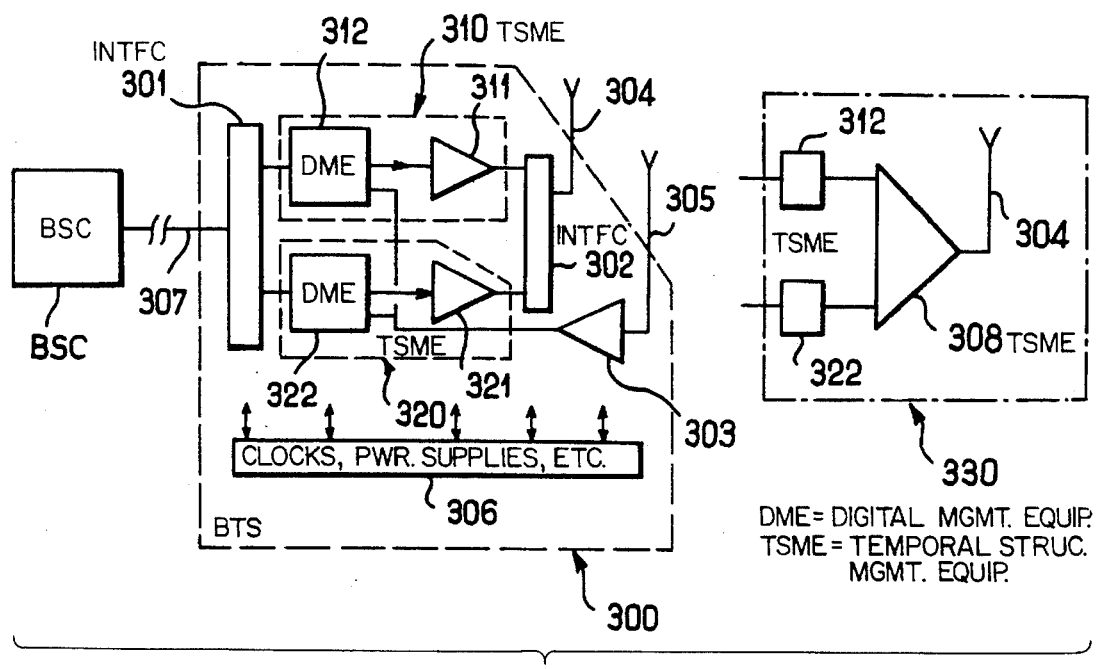
FIG_3
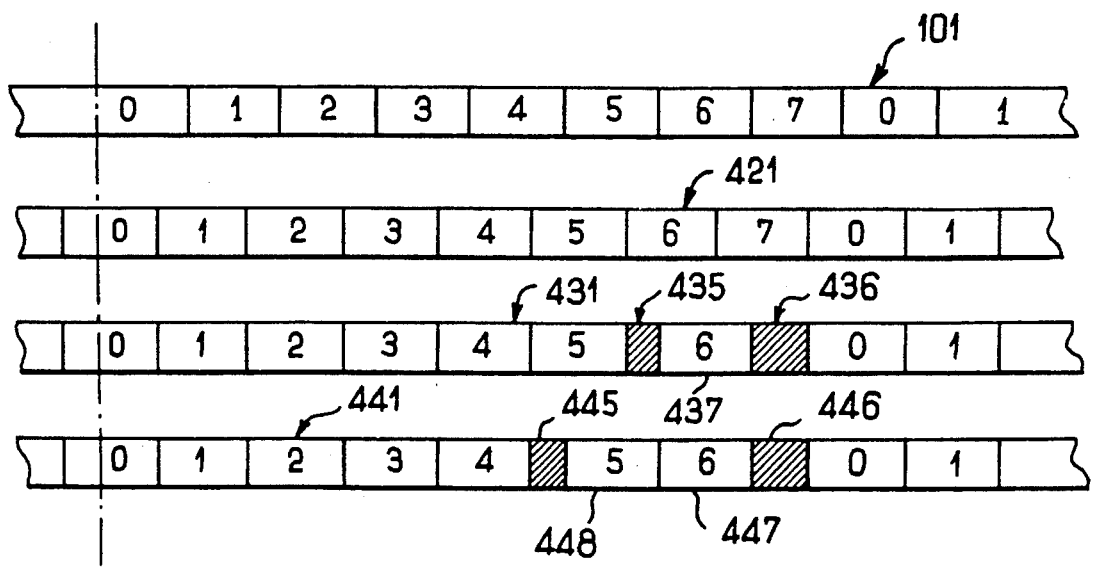
FIG_4

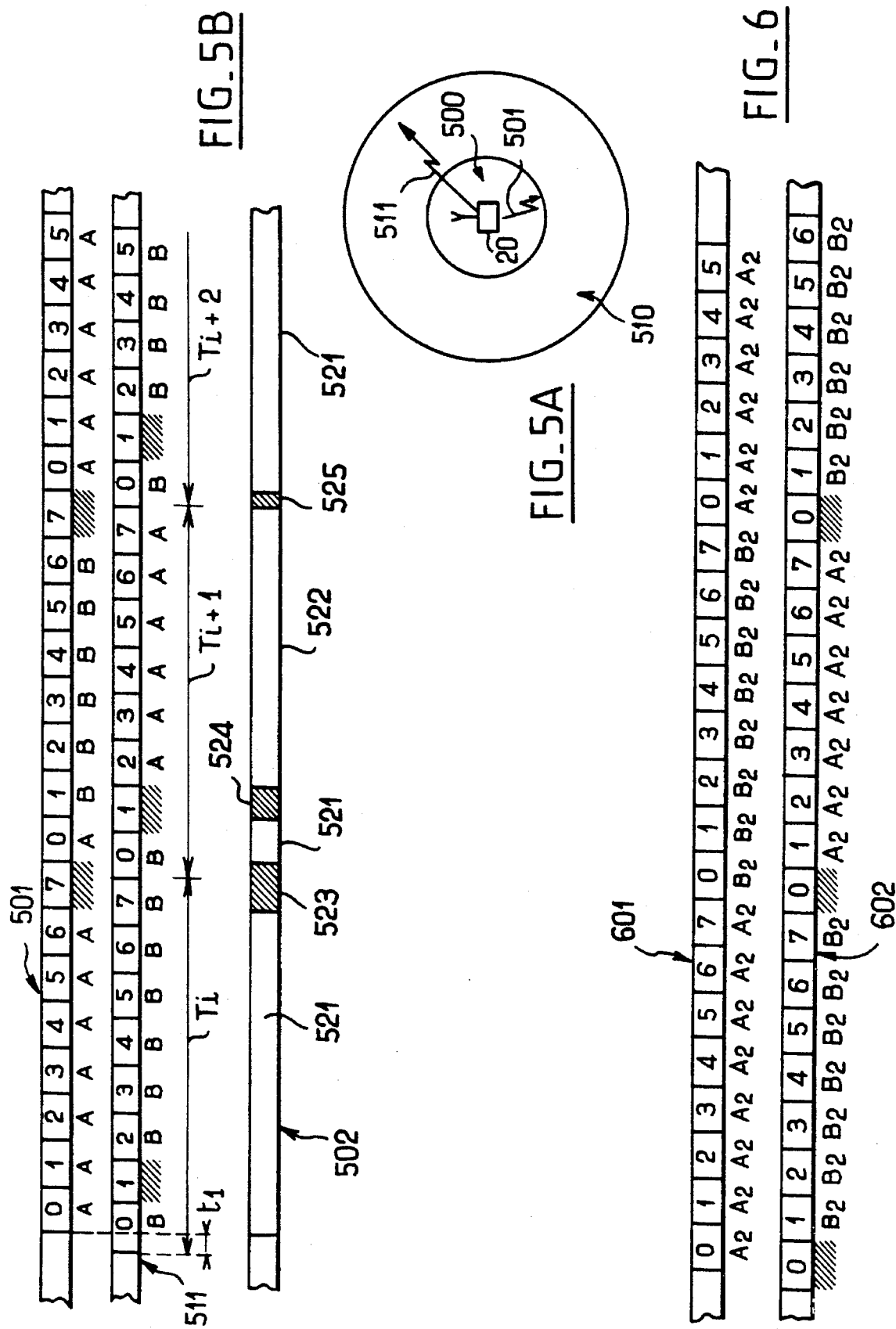

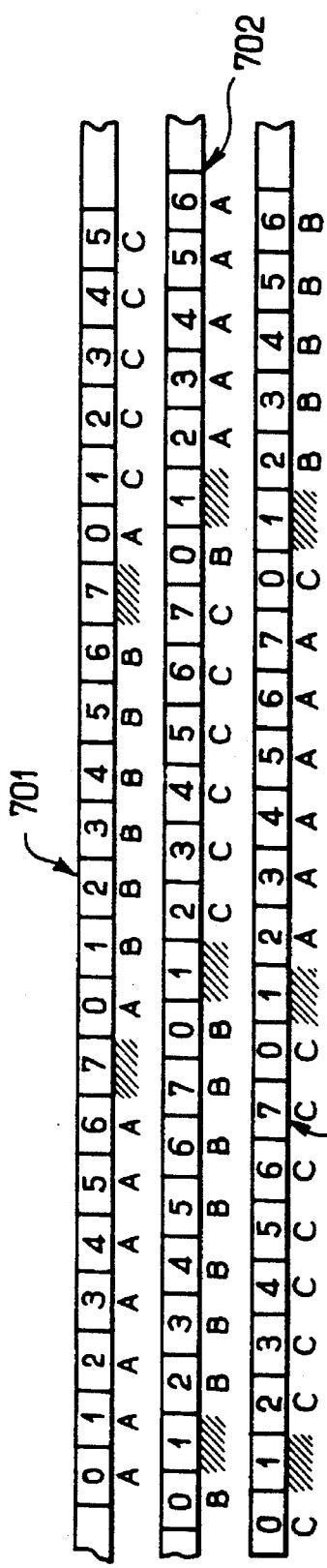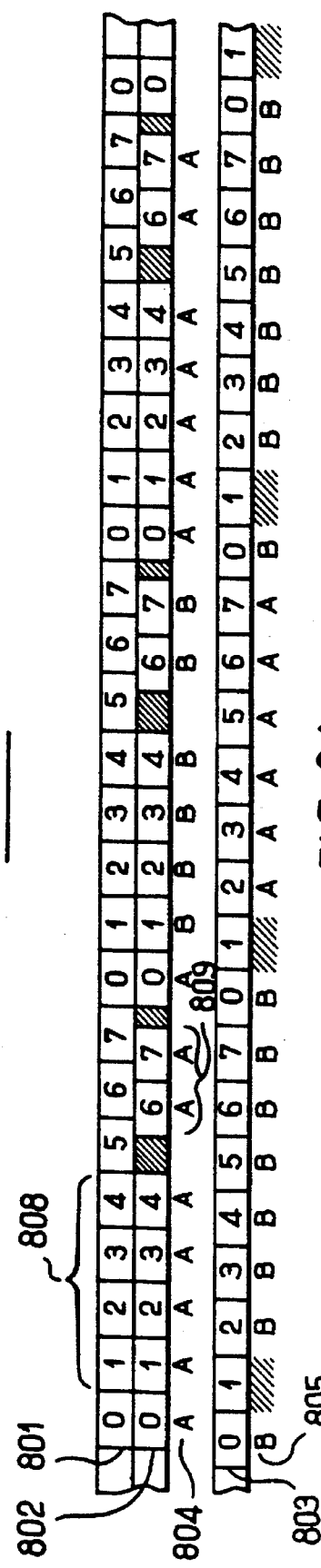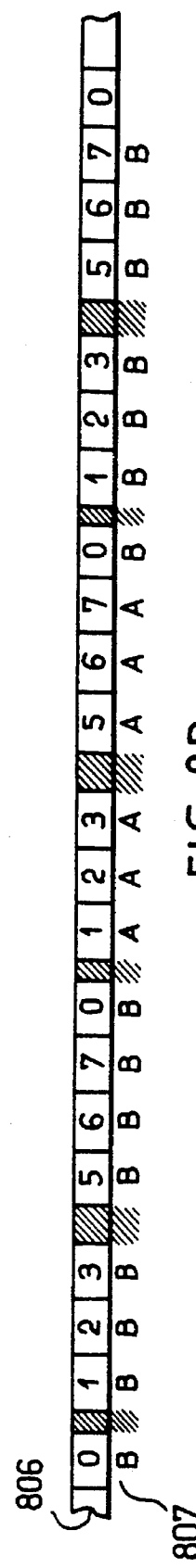

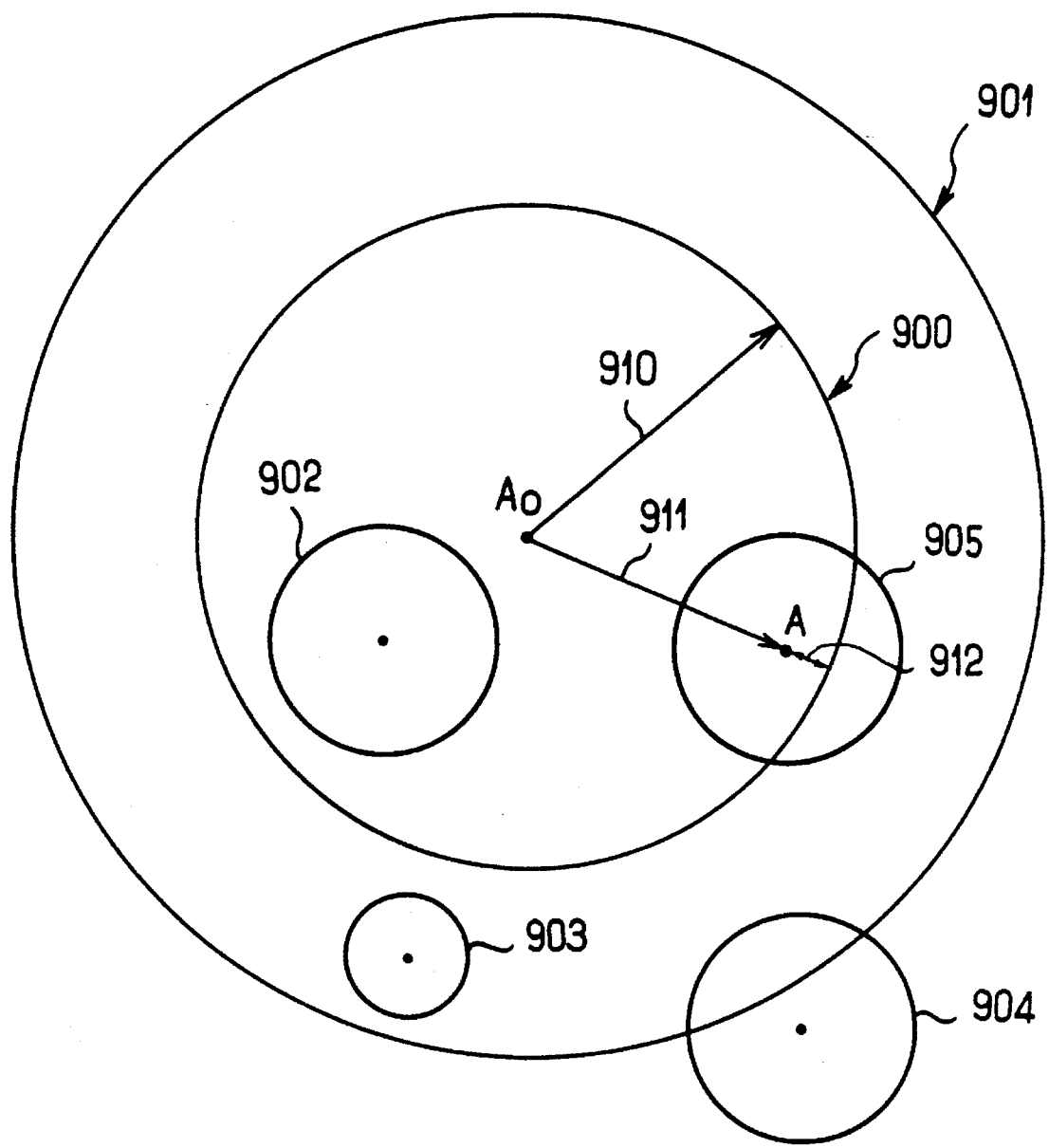
FIG_9

METHOD FOR ALLOCATING A TIMESLOT WITHIN A FRAME TO A MOBILE ENTERING A COMMUNICATIONS CELL AND BASE TRANSCEIVER STATION IMPLEMENTING THIS METHOD

BACKGROUND OF THE INVENTION

1. Field of the Invention

The present invention concerns a method for allocating a timeslot within a frame to a mobile entering a communication cell.

It also concerns a base transceiver station implementing this method.

2. Description of the Prior Art

In a time division multiple access (TDMA) mobile radio network a plurality of transmitters (eight in the case of the GSM system) use the same radio resource by allocating each mobile a timeslot.

In the case of the GSM system (Global System for Mobile communications) the timeslot duration is 577 µs and the frame duration is 4.6 ms.

In most mobile radio systems some frequencies are transmitted continuously to enable the mobiles to identify them more easily given that, during a call, they have only a very short timeslot, as already indicated: for them to make reliable measurements, the power transmitted at these frequencies must always be the same.

In the case of a GSM system using a TDMA structure, timeslot 0 is used on the beacon channel to transmit specific information:

in the downlink direction, it is used to indicate general parameters of the cell to all mobiles, to call them and to allocate them a radio channel;

in the uplink direction it is used by the mobiles to indicate that they require a connection to the cell (random access signal).

One problem with this type of temporal structure is that the radio signal propagation time cannot be ignored if the mobile is at a great distance from the relevant base transceiver station (BTS).

In current GSM systems this problem is solved in the following manner: when a mobile enters the cell for the first time it sends a random access signal with a time-delay strictly equal to three timeslots; the reason for using this (fixed) value is explained below. When the BTS receives this signal it measures the time difference between it and its own receive timing reference which is offset exactly three timeslots relative to its transmission. This arrival time is equivalent to the return journey time for a radio wave between the BTS and the mobile. The base transceiver station then allocates a timeslot to the mobile and indicates to the latter the timing advance it is to use for transmitting.

Referring to FIG. 1, the mobile MS1 21 in the immediate vicinity of the base transceiver station 20 sends a random access signal RA1 1 with a null time-delay 2 and is allocated timeslot 6 (3). It then transmits with a time-delay equal to 3TS-0, the value 0 being indicated to it when it is allocated timeslot 6.

Likewise, the mobile MS2 22 at a great distance from the base transceiver station 20 sends a Random Access signal RA2 2 with a time-delay TA2 and is allocated timeslot 1 (13). It then transmits with a time-delay equal to 3TS-TA2, the value TA2 being indicated to it when it is allocated timeslot 1.

The choice of the receive/transmit time-delay by the mobile is dictated by the fact that with eight timeslots the mobile must:

listen out for its timeslot at the frequency f1;

transmit in its timeslot at the frequency f2; and measure the power level at a frequency f3 to determine the level at which it receives from neighbouring cells.

The most economic solution for operating at these three frequencies is to use a single frequency synthesizer. As direct synthesis type synthesizers are too costly for a system in which the price of the terminal is a key factor in commercial success, the most appropriate solution is a phase-locked loop synthesizer. As these synthesizers have a relatively long synchronization time it is important to distribute optimally the three timeslots mentioned above and during which the generated frequency has to be stable.

Considering that the mobile measures the power level at the frequency f3 during a timeslot, the mobile has (8-3)/3= 1.7 timeslots to change frequency. As the mobile must be able to advance its transmission by a timing advance TA, the decision has been taken to separate the receive and transmit timeslots by a time equal to 2 TS.

The remaining time for switching from one frequency to the other is therefore:

1.5 TS from f2 to f3 and from f3 to f1;

2 TS-TA from f1 to f2.

By choosing a maximum value of TA equal to 0.5 TS, the timing constraint for changing from one frequency to another is always 1.5 TS. Other constraints have led to the choice of a maximum value of TA equal to 63 bits of on air modulation, which is equivalent to 0.41 TS. One of these constraints is that the random access signals must always be received in their entirety during the timeslot, regardless of the distance to the mobile: the farther away the mobile, the less the information carrying capacity of the random access signal.

This outline of the reasons which led to this choice clearly shows that it is not possible to increase indefinitely the maximum value of TA for mobiles at increasing distances: the current limit on TA cannot be exceeded without calling into question the electronic design of the mobile and the usable length of the random access message.

For true mobiles the economic benefits of large area cells are relatively minor as the transmit power requirements quickly render the mobiles very bulky. On the other hand, the economic benefits are strong for "fake" mobiles which are actually at a fixed location with a directional antenna pointing towards the base transceiver station, providing radio communications at an infrastructure cost which bears no comparison with that for a cable network. The only limitation is then that imposed by the distance to the horizon.

To be able to exchange data with mobiles at distances in excess of 35 km the solution usually recommended is relatively simple, as explained in "The GSM System" written and published by Michel MOULY and Marie-Bernadette PAUTET (ISBN 2-9507190-0-7); the receive timeslots are grouped in pairs: 0+1, 2+3, 4+5 and 6+7, and the base transceiver station uses a receive window that varies with the distance to the mobile, in one of a variety of feasible implementations:

a timing advance TA=0 can be indicated to the mobile at all times and the receive window moved according to the actual distance between the base transceiver station and the mobile; in this case the temporal structure can handle only four mobiles, each mobile always requiring a pair of timeslots;

the mobile can be managed in the conventional way at distances up to 35 km and a timing advance TA equivalent to 35 km always indicated beyond that distance; the management procedure is more difficult, but enables use of only two timeslots when this is really necessary.

In all cases timeslots 0 and 1 of the beacon channel used to receive the random access signals have to be reserved for this use only, the random access signals from distant mobiles overlapping these two timeslots.

The overall balance of a system of this kind is rather poor, as compared with a conventional base transceiver station:

the analog transmit and receive equipments are used to only 50% of their initial capacity, which is all the greater a penalty in the case of the transmitters as they must have a high power rating, given the distances involved;

the digital processing equipment suffers from the same underuse, unless specific and difficult precautions are implemented; this limitation continues to apply to timeslot 0 of the beacon channel, regardless of the implementation selected, because of the problem of the random access signal.

A result of all these considerations is that the frequencies are largely underused. This is of less importance as frequency requirements are a priori limited if very large cells are used and as the possibilities for frequency re-use are much greater than with small cells. This is because, as the propagation laws are inverse square laws in respect of the distance, large cells enable the same frequencies to be re-used more often.

SUMMARY OF THE INVENTION

An object of the present invention is to remedy these drawbacks by proposing a method whereby all mobiles in each cell managed by the base transceiver station can be grouped into a common temporal structure.

According to the invention, in a method for allocating a timeslot in a frame to a mobile entering one cell of a set of concentric cells around a base cell managed by a base transceiver station communicating with each mobile present in a cell using a downlink frame temporal structure from said base transceiver station to said mobiles and an uplink frame temporal structure from said mobiles to said base transceiver station for each cell said uplink temporal structure is offset relative to said downlink temporal structure by a time-delay equal to the sum of a basic offset between said basic downlink temporal structure and said basic uplink temporal structure of said basic cell and an offset time dependent on the rank of said cell within said set of cells.

With the method according to the invention it is therefore possible to make better use of the timeslots of temporal structures corresponding to concentric cells and therefore to contribute to more rational use of the transmit-receive equipments. Considering a basic cell with a radius of 35 km, for example, if a mobile less than 35 km away from the antenna of the basic cell attempts to connect to the base transceiver station managing mobiles more than 35 km away, its random access signal is not decoded by the base transceiver station as it is not in the correct temporal window; to the contrary, it interferes with the timeslot of the base transceiver station in the uplink direction. The same problem arises for the timeslot in the converse case. In all cases, this interference can be prevented by inhibiting the respective timeslot, but this is a costly solution, especially in view of the low level of radio interference caused. Note that in these cases the mobile will naturally try the "right" cell after a number of unsuccessful attempts defined by the system in the general information broadcast on the beacon channel.

In another aspect, the invention consists in a base transceiver station for managing a set of communication cells comprising interface means to a base station controller, interface means to a transmit antenna and pre-amplifier means for signals from a receive antenna, implementing the method according to the invention and which further comprises digital management means for each cell for managing temporal structures corresponding to said cell, connected to said interface means to said base station controller and having a transmit output connected to power amplifier means on the input side of said interface means to said transmit antenna and a receive input connected to said power pre-amplifier means.

Other features and advantages of the invention emerge from the following description given by way of non-limiting example with reference to the appended drawings.

BRIEF DESCRIPTION OF THE DRAWINGS

FIG. 3 shows one embodiment of a base transceiver station for implementing the method according to the invention.

FIG. 4 shows a preferred embodiment of the method according to the invention using dynamic channel allocation.

FIG. 5A shows a specific embodiment of the method which optimizes frequency hopping.

FIG. 5B shows the temporal structures corresponding to the FIG. 5A embodiment of the method.

FIG. 6 shows an embodiment of the method according to the invention for two cells using two sets of frequencies.

FIG. 7 shows an embodiment of the method according to the invention for three cells using three frequencies.

FIG. 8A shows an embodiment of the method according to the invention incorporating frequency hopping.

FIG. 8B shows a temporal structure integrating into its frames distant mobiles and near mobiles with frequency hopping.

FIG. 9 shows various situations of a mobile passing from one cell to another.

DETAILED DESCRIPTION OF THE PREFERRED EMBODIMENTS

Figures 1A, 1B, 2:
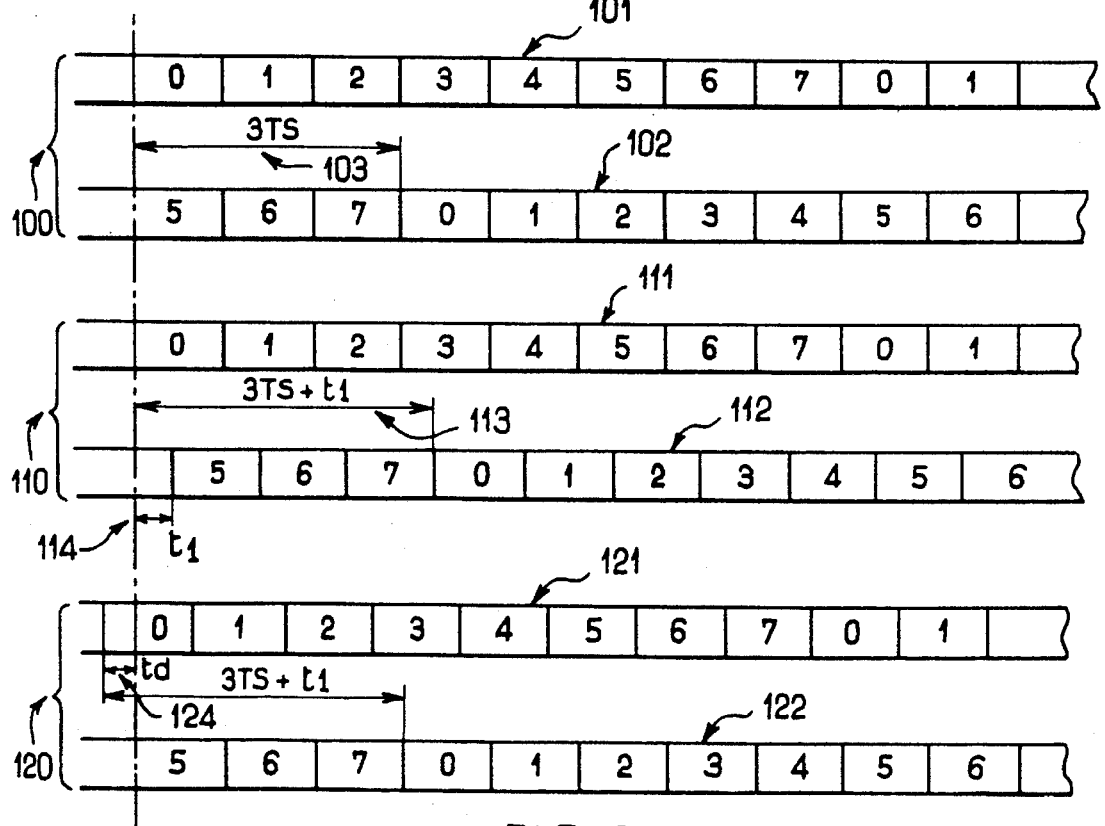
FIG. 1A shows a mobile near a base transceiver station and a mobile far from the latter.
FIG. 1B shows timing diagrams for timeslot allocation in accordance with the prior art.
FIG. 2 shows various temporal structures for the method according to the invention.

The theory behind the method according to the invention and how the theory is applied in the case of the GSM system are explained first.

Application of the method according to the invention to a GSM system is aimed at grouping all mobiles in a cell between 35 km and 70 km into a common temporal structure "offset" 35 km relative to a basic temporal structure corresponding to a basic cell between 0 km and 35 km.

FIG. 2 shows various temporal structures:

The timing diagram 100 shows the basic temporal structure defined for the GSM system: the downlink temporal structure 101 and the uplink temporal structure 102 are offset by exactly three time slots, 3.TS 103.

The timing diagram 110 shows a first configuration in which the downlink temporal structure 111 is synchronous with the basic structure 101, the uplink structure 102 being offset by a time period t1 114 relative to the basic structure 102, resulting in an effective offset of 3TS+t1 113 between the downlink and uplink structures.

The timing diagram 120 shows a second configuration in which the offset is equal and opposite to the previous offset. The choice of configuration depends essentially on the internal structure of the base transceiver station that has to be modified to implement the invention.

Configuration 110 is preferable if the base transceiver station includes a facility for temporary storage of information in the downlink direction for a time period at least equal to t1.

Configuration 120 is preferable if the base transceiver station includes a facility for temporary storage of information in the uplink direction for a time period at least equal to t1.

A combination of configurations 110 and 120 can be used in intermediate situations. A temporary storage device can be added to the base transceiver station if necessary.

The time periods t1 114, 124 are preferably determined from the following equation:

$$t1 = k.(R-M)$$

where:

R is the radius of the basic cell, i.e. 35 km in the present instance of the GSM system;

M is the margin, i.e. a distance intended to allow overlapping between two concentric cells; and k is the rank of the cell in which the mobile is located:
the value k=0 represents the basic cell, as defined in a current GSM system: the equation does not apply and t1=0;
the value k=1 represents mobiles at distances between (35–M) km and (70–M) km;
the value k=2 represents mobiles at distances between (70–2M) km and (105–2M) km.

It is clear that distances beyond 70 km can be catered for by juxtaposing a plurality of annular cells.

In the following description a cell is said to have a radius of 35, 70, etc kilometers. These distances have to be corrected according to the above equation to allow for the margin of overlap between adjacent cells.

Each cell obviously has to have a beacon channel which monopolizes timeslot 0. The economic balance for two temporal structures, as compared with the prior art, is therefore as follows:

prior art: 2×4–1=7 mobiles can operate at distances between 0 km and 70 km;
invention: 2×(8-1)=14 mobiles can operate, seven at distances between 0 km and 35 km and seven at distances between 35 km and 70 km.

The flexibility of the invention can be enhanced, as explained below.

Note that the implementation of these cells is particularly economic as all the components, except for the temporal structure management analog and digital equipment, is common: although there are two or more cells, there is only one transmit/receive antenna and one receive antenna preamplifier. Likewise, a single transmit antenna amplifier can be used for all the cells.

FIG. 3 shows an embodiment providing coverage of the [0–35] km and [35–70] km areas from a standard base transceiver station 300.

The base transceiver station 300 is connected to the base station controller BSC by an Abis or equivalent type connection 307 and to the mobiles by the transmit antenna 304 and the receive antenna 305.

The components common to a prior art base transceiver station and a base transceiver station according to the invention are:
an interface 301 to the BSC;
an interface 302 to the transmit antenna;
basic components 306, including clocks and power supplies;
an antenna preamplifier 303.

Each temporal structure management equipment 310, 320 comprises:
power amplifiers 311, 321 (these can be replaced by a single amplifier 308);
digital management equipments 312, 322 for managing the digital part of each temporal structure management equipment 310, 320; the receive part of these equipments includes analog-to-digital converters which are not usually provided in the antenna preamplifier 303.

If the number of temporal structure management equipments is large, it is possible without departing from the scope of the invention, and can be beneficial, to add an electronic switching system for connecting any digital equipment 312, 322, etc to any power amplifier 311, 321, specifically to enable implementation of frequency hopping.

Likewise, a receive switching system can be provided between the receivers and the digital part to enable the use of receivers operating at fixed frequency. The theory as explained above remains valid.

To provide the indicated coverage the temporal structure management equipment 320 merely has to be offset in time as shown in FIGS. 2, with reference to the configurations 110 or 120, all other equipments remaining the same.

Starting from this basic implementation, it is a simple matter to increase the flexibility of the system by allowing for a greater variety of configurations of mobiles between 0 km and 35 km and between 35 km and 70 km.

This improvement is shown in relation to the 100 and 120 configurations, but could equally well be implemented on the 100 and 110 configurations, for example.

The method entails dynamic configuration of the timeslots with or without timing advance:

The equipment 310 (320) transmits and receives timeslot 0 in the 100 (120) configuration.

When the mobiles enter a cell, they are allocated for preference the lowest number timeslots in their cell managed by the equipments 310 or 320.

If the cell managed by the equipment 310 is full (beacon channel+7 mobiles), for example, and the cell managed by the equipment 320 still has at least timeslots 6 and 7 available, if a mobile requires to enter the cell managed by the equipments 310, 320 will take it instead, using timeslot 6 transmitted with no timing advance.

Timeslot 7 is thereafter unusable either for near or distant mobiles.

Of course, if timeslots 6 and 7 are not available one or two internal handovers to 320 would enable them to be made available if two other timeslots are available in 320.

In this embodiment the temporal structure 120 of FIG. 2 is modified as shown in FIG. 4.

The basic temporal structure 101 is reproduced to show the timescale.

The temporal structure 421 represents the situation in which all the timeslots 1 through 7 of a frame are used for mobiles located in the second cell ([35–70] km).

If timeslot 6 (437) is used for a mobile between 0 km and 35 km, the temporal structure 431 results, in which the timeslots 435 and 436 are lost.

Transmission cannot be stopped during these timeslots. There is a free choice of the data stream to be transmitted provided that it is not possible to confuse it with the GSM "Frequency Correction Channel" or "SCH Synchronization Channel" signals. For example, the start of a "dummy burst" can be transmitted for timeslot 435 and the end of the same dummy burst for timeslot 436.

If two timeslots, for example timeslots 5 and 6 (448, 447) are used for two mobiles located in the [0–35] km cell, two timeslots 445, 446 are not used.

The method can be repeated up to the point at which timeslots 1 through 6 are used in "near" mode.

Regardless of the number of timeslots used between 0 km and 35 km, only one timeslot is lost: it is possible to managed 13 mobiles at any distance between 0 km and 70 km, or 14 mobiles if they are equally divided between 0 km and 35 km, on the one hand, and 35 km and 70 km, on the other hand.

The equipment 310 can manage mobiles at distances in excess of 35 km by causing it to advance its transmission as in the equipment 320: it loses timeslot 6 (more generally timeslot i) and it manages this mobile in timeslot 7 (more generally in timeslots i+1, . . . , 7).

In an advantageous embodiment of the invention the cell frequencies can be changed dynamically to implement frequency hopping. An embodiment of the method according to the invention with which frequency hopping can be optimized is shown in FIGS. 5A and 5B. A first cell 500 covers the area from 0 km to 35 km. Its beacon channel uses a first frequency A. Timeslot 7 is not used. A second cell 510 covers the area from 35 km to 70 km. Its beacon channel uses a second frequency B. Timeslot 1 is not used. The cell transmitted represents a bit stream 511. The temporal structures 501 and 511 are shown with the timeslots and the frequencies used during the usable timeslots for frames i, i+1 and i+2 in part. For convenience of explanation it is assumed that the frequencies A and B are interchanged on each frame but this interchange can equally well be pseudo-random provided that the two cells use a common algorithm so that the two choices are mutually exclusive. In the context of a GSM system this mutual exclusivity can be achieved in either of the following ways:

by using cyclic frequency hopping;
by using pseudo-random frequency hopping using the same "Hopping Sequence Number" (HSN).

In both cases the two cells must be synchronized, ignoring the time difference t1 already mentioned.

With reference to use of the frequency A in relation to the temporal structure 502, a plurality of characteristic areas can be distinguished:
area 521: the frequency is used to manage the mobiles in the coverage area of cell 500;
area 522: the frequency is used to manage the mobiles in the coverage area of cell 501;
area 523: during this timeslot the frequency is not allocated to any mobile; the cell 500 transmits a dummy burst as defined in the GSM recommendation; and
areas 524, 525: these incomplete timeslots can be processed in the same way as the timeslots 435, 436, as already explained with reference to FIG. 4; thus the start of a dummy burst can be transmitted for area 524 and the end of this burst for area 525.

The configuration with frequency hopping just described for two frequencies and two cells can be readily extrapolated to other situations.

There can be more than one frequency per cell, for example. If cell 500 uses frequencies A1, A2, . . . , An and cell 501 uses cells B1, B2, . . . , Bn, then all the mobiles use a resultant set of frequencies A1, A2, . . . , An, B1, B2, . . . , Bn and use the same timeslots.

In another configuration the frequencies of the beacon channels A1, B1 are treated as described above, the frequencies A2, . . . , An and B2, . . . , Bn being used as described with reference to FIG. 6. Note that in the temporal structures 601, 602 shown the 35 km radius cell uses the frequencies A2 and B2 alternately in all timeslots and the [35–70] km cell uses the other frequency in all timeslots except timeslot 0, which is not used (to prevent conflict). Note that, if required, timeslot 0 can be used in this cell if it is available in the other, either statically or dynamically, depending on the traffic load of each cell. In all cases where there is more than one frequency per cell the timeslots in which the transmitters have nothing to transmit do not have to be occupied by a signal as these are not beacon channels. Note that the timeslot number and the cell must be allocated dynamically.

A second situation is that of three concentric cells. Frequency hopping is on three frequencies in this case, as shown in FIG. 7. Note that the theory is derived directly from the theory shown in FIG. 5, the time shift between the two end cells being less than the duration of a timeslot.

Here a base transceiver station BTS manages three concentric cells using respective first, second and third frequencies A, B and C. The second and third temporal structures 702, 703 respectively corresponding to the second and third cells are respectively offset by first and second offset times relative to the first and second temporal structures 701, 702; the offset between the first and third structures 701, 703 is less than the duration of a timeslot.

For each temporal structure 701, 702, 703 the frequency allocated in each successive frame is changed, either cyclically or pseudo-randomly, for example, a timeslot of predetermined rank being unused in each frame of each temporal structure 701, 702, 703 so that at any time the respective timeslots of each temporal structure have different frequencies or are not used; this avoids any frequency conflict.

In a third situation the time-delay between the extreme cells is greater than the duration of a timeslot. In this situation the following options are available:
either to delete a further timeslot per cell to avoid temporal overlapping;
or to group the cells in groups comprising at most three consecutive cells and to apply frequency hopping within each of these groups.

It is possible to combine the configurations of FIG. 4, on the one hand, and of FIGS. 5, 6 or 7, on the other hand, to obtain dynamic allocation of timeslots in combination with frequency hopping. For simplicity of representation only the configuration with two cells each using one frequency is shown in FIG. 8A, which shows:

a basic temporal structure 801 of the first ([0–35] km) cell; the frequencies associated with the timeslots are indicated at 804;
a temporal structure 802 corresponding to the situation in which four mobiles are at distances of less than 35 km (timeslots 1–4) and two mobiles are at distances between 35 km and 70 km (timeslots 6 and 7);
a basic temporal structure 803 of the second ([35–70] km) cell; the frequencies associated with the timeslots are indicated at 805.

This principle can naturally be used for a different distribution of the timeslots between two cells, the basic principle being always to define a group of near mobiles using a set 808 of consecutive timeslots and a group of distant mobiles using a set 809 of timeslots. It is also possible to mix the timeslots and the mobiles completely provided that:

the [0–35] km cell manages the near mobiles from timeslot 1 and the distant mobiles from timeslot 6;

the [35–70] km cell manages the near mobiles from timeslot 1 and the distant mobiles from timeslot 7.

The temporal structure 806, whose associated frequencies are indicated at 807, represented in FIG. 8B corresponds to the situation in which timeslots 1, 2 and 3 are allocated to near mobiles and timeslots 5, 6 and 7 are allocated to distant mobiles. Note that each cell can manage six mobiles at any distance with one frequency hop, i.e. twelve mobiles for the combination of the two cells.

The table below shows for each configuration and embodiment the number of mobiles that can be managed in each cell by the base transceiver station.

|  | distance to mobile | | |
| --- | --- | --- | --- |
|  | [0–35] km | [35–70] km | [0–70] km |
| Non-dynamic allocation | 7 | 7 | — |
| Dynamic allocation without frequency hopping | 7 or x | 7 or 13–x | — or 13 |
| Frequency hopping | 6 | 6 | 0 |
| Frequency hopping + dynamic allocation | x | 12–x | 12 |

The variable x represents the margin for maneuver or latitude available to the management systems, for example a base station controller BSC or any other system on the uplink side.

It is also possible to use the method according to the invention in a base transceiver station which has no central cell but only concentric annular cells.

One specific aspect of the method according to the invention relating to the movement of a mobile from one cell to another is described next. A "handover" (GSM terminology) or "handoff" (U.S. terminology) procedure is used to bring this about. It consists in delaying by a predetermined amount the transmission of digital information that the mobile has to transmit in order to synchronize with the base transceiver station of the new cell.

FIG. 9 shows various situations characteristic of movement from one cell to another. This figure shows:

two concentric cells 900, 901 managed by the method according to the invention;

a cell 902 which the cell 900 overlaps entirely;

a cell 903 which is entirely overlapped by the cell 901 but not by the cell 900;

a cell 904 which partially overlaps the cell 901 only;

a cell 905 which partially overlaps the concentric cells 900 and 901.

When a mobile is in one of these cells and must leave it because it is moving, the following rules are preferably applied in place of the usual power balance rules:

from departure cell 902, handover to cell 900, not to cell 901;

from departure cell 903, handover to cell 901, not to cell 900;

from departure cell 904, handover to cell 901 or another cell, not to cell 900;

from departure cell 905: if the mobile in cell 905 has a time offset corresponding to a distance less than the distance 912 corresponding to the inside radius 910 of the cell 900 less the distance 911 between the respective antennas Ao, A of the cells 900 and 905, handover is to cell 900. This rule is applied if the antenna A of the cell 905 is in the coverage area of the cell 900. It must be reversed otherwise.

If the criterion stated above is not met, i.e. if the mobile in the departure cell 905 has a time offset corresponding to a distance greater than the distance 912 corresponding to the inside radius 910 of the cell 900 less the distance 911 between the respective antennas Ao, A of the cells 900 and 905, then handover is preferably to the concentric cell inside which the antenna of the cell 905 is located. If this first handover procedure fails, an attempt is made to handover to the other concentric cell. In the case of a non-omnidirectional departure cell, handover is effected to the cell overlapping the departure cell to the greater extent.

The invention is of course not limited to the examples that have just been described and many adaptations can be applied to these examples without departing from the scope of the invention. In particular, the method according to the invention is not limited to the cell radius examples included in the description and can be applied to other communication systems having different cell radii.

There is claimed:

1. A method for enabling a base transceiver station to manage a set of concentric circular cells surrounding a basic cell so as to enable each mobile, of a plurality of mobiles, which enters one of said cells, to communicate with said base transceiver station, said method comprising: using a first downlink frame temporal structure, from said base transceiver station to said mobiles, and a first uplink frame temporal structure from said mobiles to said base transceiver station; and, for each cell, offsetting said first uplink frame temporal structure relative to said first downlink frame temporal structure by a time-delay equal to the sum of (1) a basic offset time period between a basic downlink frame temporal structure and a basic uplink frame temporal structure of said basic cell, and (2) another offset time period dependent on the radial rank of said each cell within said set of concentric cells.

2. The method according to claim 1, wherein said first downlink frame temporal structure is synchronized with said basic downlink frame temporal structure, said first uplink frame temporal structure being delayed by said another offset time period relative to said basic uplink frame temporal structure.

3. The method according to claim 1, wherein said uplink frame temporal structure is synchronized with said basic uplink frame temporal structure, said downlink frame temporal structure being advanced by said another offset time period relative to said basic downlink frame temporal structure.

4. The method according to claim 1, wherein said uplink frame temporal structure is delayed by a first time period relative to said basic uplink frame temporal structure, and said downlink frame temporal structure is advanced by a second time period relative to said basic downlink frame temporal structure, the sum of said first and second time periods being equal to said another offset time.

5. The method according to claim 1, wherein said basic cell has a predetermined radius, wherein said concentric cells are concentric annular cells whose radial width is substantially equal to said predetermined radius, wherein two adjacent cells have a predetermined partial overlap, and wherein said another offset time period (µs) is determined by the following equation:

$$t1 = k.(R-M)$$

where R is the radius (km) of said basic cell, M is a margin (km) of overlap between two adjacent cells, and k is the rank of the cell in which said mobile is located.

6. Method according to claim 1 wherein when a mobile enters a first cell and sends a random access request, if all the timeslots in a frame associated with said cell are occupied, said mobile is allocated an available timeslot in a frame associated with a second cell adjacent the first cell, the timeslot allocated being transmitted with no time offset relative to said first cell.

7. Method according to claim 1 applied to said base transceiver station managing first and second cells each using on their respective beacon channel first and second frequencies, the transmit temporal structure of said second cell being offset by an offset time relative to the transmit temporal structure of said first cell, wherein in each temporal structure frequency changes are effected so that at any time the respective frequency allocations in the two temporal structures are mutually exclusive and in each frame of each temporal structure a timeslot of predetermined temporal rank is not used.

8. Method according to claim 1 applied to said base transceiver station managing first and second cells respectively using a first set of frequencies and a second set of frequencies, wherein for at least a pair of temporal structures respectively associated with said first and second cells and respectively using a first frequency and a second frequency respectively chosen from a resulting set of frequencies, frequency changes are effected so tidal at any time the respective frequency allocations, in the timeslots of said respective temporal structures, are mutually exclusive.

9. Method according to claim 8 applied to said base transceiver station managing first and second cells each using on their respective beacon channel first and second beacon channel frequencies from respective first and second sets of frequencies, wherein in a first pair of temporal structures respectively associated with said first and second cells and using said two beacon channel frequencies, frequency changes are effected so that at any time the respective frequency allocations in these two temporal structures are mutually exclusive.

10. Method according to claim 9 wherein, in the other pairs of temporal structures respectively associated with said first and second cells and using said first and second frequencies respectively belonging to said first and second set of frequencies and being other than said beacon channel frequencies, frequency changes are effected, said first temporal structure using for each frame one or the other of said first and second frequencies in all said timeslots and said second temporal structure using for its timeslots the frequency that is not used by said first structure, a timeslot not being used in each frame of either one of said first and second temporal structures to avoid any frequency conflict.

11. Method according to claim 1 applied to said base transceiver station managing three concentric cells respectively using a first, a second and a third frequency, the second and third temporal structures respectively corresponding to said second and third calls being respectively offset relative to said first and second temporal structures by first and second offset times (µs) determined by the following equation:

$$t1 = k.(R-M)$$

where R is the radius (kM) of said basic cell, M (kM) is a margin of overlap between two adjacent cells, and k is the rank of the cell in which said mobile is located, when said set of cells comprises a basic cell of predetermined radius and concentric annular cells whose width is substantially equal to said radius and two adjacent cells have a predetermined partial overlap, and the offset between said first and third temporal structures being less than the duration of a timeslot, wherein for each temporal structure the frequency allocated to each successive frame is changed, a timeslot of predetermined rank is not used in each frame of each temporal structure so that at any time the respective timeslots of each temporal structure have different frequencies or are not used in order to prevent any frequency conflict.

12. Method according to claim 1 applied to said base transceiver station managing a set of concentric cells, the respective temporal structures of the two radially extreme concentric cells of said set having an offset greater than the duration of a timeslot, wherein a further timeslot is eliminated in each frame of the temporal structures of each cell.

13. Method according to claim 1 applied to said base transceiver station managing a met of concentric cells, the respective temporal structures of the two radially extreme concentric cells of said set having an offset greater than the duration of a timeslot, wherein said cells are grouped into groups comprising at most three consecutive cells and frequency hopping is effected within each group.

14. Method according to claim 1 applied to said base transceiver station managing a plurality of cells, containing first and second cells associated with first and second temporal structures, and further comprising the generation of a resultant first temporal structure synchronized with the basic first temporal structure, and including in each frame: a first group of consecutive the slots allocated to mobiles in said first cell and synchronized with the timeslots of the same rank in said first temporal structure, an unused timeslot, and a second group of consecutive timeslots allocated to mobiles in said second cell and synchronized with the timeslots of the same rank in said second temporal structure.

15. Method according to claim 14 applied to a set of cells each associated with a set of frequencies, further comprising frequency hopping when passing from one frame to the other.

16. Method according to claim 7 wherein said frequency changes consist in cyclic frequency hopping.

17. Method according to claim 16 wherein said frequency changes are effected in each new frame.

18. Method according to claim 17 wherein said frequency changes consist in pseudo-random frequency hopping.

19. Method according to claim 1 wherein whenever a temporal structure comprises timeslots not used by a mobile portions of a dummy burst are transmitted during those timeslots.

20. Method according to claim 1, a moving mobile during a handover procedure having to go from a departure cell to a new cell of a set of concentric cells comprising a basic cell and managed by said method, wherein to determine said new cell the usual power balance rules are replaced with rules for identifying said departure cell relative to said concentric cells.

21. Method according to claim 20 wherein the case of a departure cell entirely overlapped by said basic cell handover is to said basic cell, to the exclusion of other concentric cells.

22. Method according to claim 20 wherein in the case of a departure cell entirely overlapped by a cell of said concentric cells but not by other concentric cells having smaller radii than said departure cell, including said basic cell, handover is to said cell entirely overlapping said departure cell.

23. Method according to claim 20 wherein in the case of a departure cell partially overlapped by a single concentric cell handover is to said single cell partially overlapping said departure cell, to the exclusion of any other concentric cell.

24. Method according to claim 20 wherein in the case of a departure cell partially overlapped by first and second concentric cells handover is to the concentric cell covering the antenna of said departure cell.

25. Method according to claim 24 wherein if handover has failed and if said mobile has in said departure cell a time offset corresponding to a distance greater than the inside radius of the first concentric cell less the distance between the respective antennas of said first concentric cell and said departure cell, handover is to the concentric cell not overlapping the antenna of said departure cell.

26. The method according to claim 1, wherein said set of concentric circular cells comprises first and second cells, and wherein said first and second cells have radii substantially equal to 35 km and 70 km, respectively.

27. A base transceiver station for managing a set of concentric communication cells, said base transceiver station comprising interface means (301) to a base station controller, interface means (302) to a transmit antenna (304), and pre-amplifier means (303) for signals from a receive antenna (305);

said base transceiver station allocating a timeslot in a frame to a mobile entering one cell of said set of concentric cells surrounding a base cell managed by said base transceiver station, communicating with each mobile present in a cell, using a downlink frame temporal structure from said base transceiver station to said mobiles and an uplink frame temporal structure from said mobiles to said base transceiver station, wherein for each cell said uplink temporal structure is offset relative to said downlink temporal structure by a time delay equal to the sum of a basic offset between said basic downlink temporal structure and said basic uplink temporal structure of said basic cell and an offset time dependent on the rank of said cell within said set of cells:

wherein said base transceiver station further comprises digital management means, for each cell, for managing temporal structures corresponding to said cell, said digital management means being connected both to said interface means (301) to said base station controller, and also to power amplifier means (311,321) on an input side of said interface means (302) to said transmit antenna (304) and to said pre-amplifier means (303).

28. Base transceiver station according to claim 27 wherein for each cell there are separate digital management means the transmit parts of which are connected to separate power amplifier means and further comprising first switching means for connecting any of said separate digital management means to any of said separate power amplifier means.

29. Base transceiver station according to claim 27 wherein to each cell there correspond separate digital management means the transmit parts of which are connected to common amplifier means.

30. Base transceiver station according to claim 27 comprising for each cell separate digital management means the receive parts of which are connected to a plurality of receivers each comprising separate pre-amplifier means, further comprising second switching means for connecting any of said separate pre-amplifier means to any of said separate digital management means.

31. Base transceiver station according to claim 27 wherein the set of cells comprises a basic cell centered on said base transceiver station and of predetermined radius and concentric cells.

32. Base transceiver station according to claim 27 wherein said set of cells comprises concentric annular cells.

* * * * *